United States Patent
D'Aurelio et al.

(10) Patent No.: US 9,053,201 B2
(45) Date of Patent: Jun. 9, 2015

(54) COMMUNICATION WITH A WEB COMPARTMENT IN A CLIENT APPLICATION

(75) Inventors: Ryan James D'Aurelio, Seattle, WA (US); Mark John Sawrey Leece, Bellevue, WA (US); Zachariah Glen Johnson, Woodinville, WA (US); Douglas Duane Berrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 13/587,864

(22) Filed: Aug. 16, 2012

(65) Prior Publication Data

US 2013/0227657 A1    Aug. 29, 2013

Related U.S. Application Data

(60) Provisional application No. 61/605,119, filed on Feb. 29, 2012.

(51) Int. Cl.
| | |
|---|---|
| *G06F 15/16* | (2006.01) |
| *G06F 17/30* | (2006.01) |
| *G06F 21/00* | (2013.01) |
| *G06F 3/048* | (2013.01) |

(52) U.S. Cl.
CPC .......... *G06F 17/30893* (2013.01); *G06F 21/00* (2013.01); *G06F 15/16* (2013.01); *G06F 3/048* (2013.01)

(58) Field of Classification Search
CPC .......... G06F 15/16; G06F 3/048; G06F 21/00
USPC ............................................... 726/5; 709/203
See application file for complete search history.

(56) References Cited

U.S. PATENT DOCUMENTS

| | | | |
|---|---|---|---|
| 6,404,445 B1 | 6/2002 | Galea et al. | |
| 6,493,871 B1 | 12/2002 | McGuire et al. | |
| 6,567,104 B1 | 5/2003 | Andrew et al. | |
| 6,983,421 B1 | 1/2006 | Lahti et al. | |
| 7,051,069 B2 | 5/2006 | Smithline et al. | |
| 7,058,944 B1 * | 6/2006 | Sponheim et al. | ............ 718/100 |
| 7,478,381 B2 | 1/2009 | Roberts et al. | |
| 7,853,943 B2 | 12/2010 | McCaleb et al. | |

(Continued)

OTHER PUBLICATIONS

"DB2 Connect and Application Servers," Retrieved on: Jul. 19, 2012, Available at: http://publib.boulder.ibm.com/infocenter/db2luw/v8/index.jsp?topic=/com.ibm.db2.udb.doc/conn/c0004784.htm, 3 pages.

(Continued)

*Primary Examiner* — Brandon Hoffman
*Assistant Examiner* — Samuel Ambaye
(74) *Attorney, Agent, or Firm* — Dan Choi; Judy Yee; Micky Minhas

(57) ABSTRACT

A secure communication method between a web compartment and a client application can allow network updates to be used for a client application. For example, a secure communication method can allow predefined operations to be carried out on a client machine. An example web compartment can include an iframe tag and the communication can be a string command, such as by using a postmessage API. Such a structure allows some user interface elements to be supplied from a client device and other user interface elements to be supplied a server computer.

20 Claims, 8 Drawing Sheets

(56) References Cited

U.S. PATENT DOCUMENTS

| | | | |
|---|---|---|---|
| 7,895,173 | B1 | 2/2011 | Dedu-Constantin et al. |
| 8,146,069 | B2 | 3/2012 | Shamilian et al. |
| 2001/0044738 | A1 | 11/2001 | Elkin et al. |
| 2005/0021791 | A1* | 1/2005 | Sakiyama et al. ............ 709/229 |
| 2006/0047693 | A1 | 3/2006 | Kojima et al. |
| 2006/0265662 | A1 | 11/2006 | Gertzen |
| 2007/0244990 | A1 | 10/2007 | Wells |
| 2008/0082604 | A1 | 4/2008 | Mansour et al. |
| 2008/0189235 | A1 | 8/2008 | Mital et al. |
| 2009/0144632 | A1 | 6/2009 | Mendez |
| 2009/0183145 | A1 | 7/2009 | Hu et al. |
| 2009/0300496 | A1 | 12/2009 | Fan et al. |
| 2010/0100823 | A1* | 4/2010 | Ewe et al. ..................... 715/733 |
| 2010/0146481 | A1 | 6/2010 | Binder et al. |
| 2010/0281107 | A1* | 11/2010 | Fallows et al. ............... 709/203 |
| 2010/0313248 | A1* | 12/2010 | Krivosheev et al. ............. 726/5 |
| 2010/0318987 | A1 | 12/2010 | Barr et al. |
| 2011/0321027 | A1 | 12/2011 | Andrews et al. |
| 2012/0072548 | A1 | 3/2012 | Kim |
| 2012/0167063 | A1 | 6/2012 | Detwiler et al. |
| 2013/0226994 | A1 | 8/2013 | D'Aurelio et al. |
| 2013/0227539 | A1 | 8/2013 | D'Aurelio et al. |
| 2014/0059528 | A1 | 2/2014 | Gagliardi |

OTHER PUBLICATIONS

"Expression Blend® 4," Published on: Nov. 10, 2010, Available at: http://www.microsoft.com/expression/products/Blend_Overview.aspx, 3 pages.

Fraternali, et al., "Rich Internet Applications," *In Proceedings of IEEE Internet Computing*, vol. 14, May 2010, 4 pages.

"Introducing Host Access Transformation Services," Retrieved on: Jul. 19, 2012, Available at: http://publib.boulder.ibm.com/infocenter/hatshelp/v75/index.jsp?topic=/com.ibm.hats.doc/doc/gsintro.htm, 13 pages.

"Kendo UI," Retrieved on: Jul. 19, 2012, Available at: http://www.kendoui.com/web.aspx, 7 pages.

"Molu Software Update," Retrieved on: Apr. 11, 2012, Available at: http://www.mophilly.com/kb/index.php/Molu_Software_Update, 6 pages.

\* cited by examiner software 180 implementing one or more innovations for updating client applications

COMMUNICATION WITH A WEB COMPARTMENT IN A CLIENT APPLICATION

CROSS REFERENCE TO RELATED APPLICATION

This application claims priority from U.S. Provisional Application No. 61/605,119, filed Feb. 29, 2012, which application is incorporated herein by reference in its entirety.

BACKGROUND

In a user interface experience, some user interface elements can be supplied from a local compartment on a host computer, and other user interface elements can be supplied by a web compartment. Elements from a local compartment can be considered trusted code because such elements were downloaded or stored on the client computer for authentication and verification prior to launching of an application. A web compartment, by contrast, includes user interface elements that are downloaded from a network, such as the Internet, in real-time during program execution. For security reasons, elements in the web compartment have very limited or no access to secure data on the host computer. As such, the web compartment can be called an isolated compartment. A well-known example of a web compartment includes the "iframe" tag in HTML-based webpages. The iframe tag typically includes a URL (i.e., a network address) used to retrieve and embed a network document in an HTML document. Other languages have similar attributes. And modern environments have started isolating network documents into restrictive sandboxes where they have little or no access to communicate with the client that they are hosted on. Typically, restrictions are placed on the embedded document so that it cannot corrupt the client computer. However, such limitations on the web compartment hamper the ability to have effective user interface elements sourced from a network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment of a client application, some application elements can be supplied from a client device and other application elements can be supplied a server computer. The server-supplied application elements can be stored in a web compartment associated with the client application that allows limited access to the client device. The web compartment can communicate with the client device using a predefined protocol so that the server-supplied application elements can execute a predetermined set of commands on the client device. Example application elements can include user interface elements as well as application functionality.

In particular embodiments, the web compartment can communicate with a local compartment in the client device. An example web compartment can include an iframe tag and the communication can be a string command, such as by using a postmessage API. Generally, there can be restrictions on downloaded updates in an inline frame, in which a document can be embedded within a webpage. In particular, web pages hosted in an iframe can have limited access to client storage.

A secure communication method between the iframe and a component running on the client computer can allow web updates to be used. For example, a secure communication method can allow predefined operations to be carried out on the client machine. The iframe generally lays over the top of a UI page so that it need not be merged into a UI page. Thus, the iframe can host a new web page from a different source than the client application.

One advantage of the embodiments described herein is that business logic can be supplied from a server and integrated into functionality of a client application. Thus, a client application need not be constantly updated when updates to the business logic are implemented. Other application features in a client can be similarly updated.

The foregoing and other objects, features, and advantages of the invention will become more apparent from the following detailed description, which proceeds with reference to the accompanying figures.

DETAILED DESCRIPTION

Figure 1:
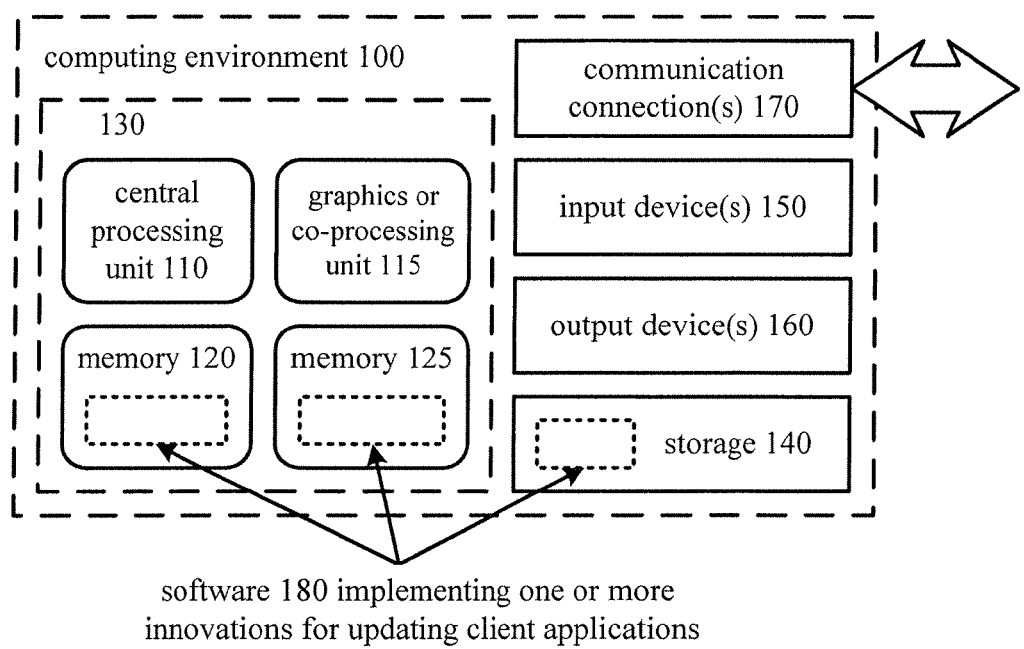
FIG. 1 shows an example architecture that can be used for a client device implementing embodiments described herein.

FIG. 1 illustrates a generalized example of a suitable computing environment 100 in which several of the described techniques and tools may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes one or more processing units 110, 115 and memory 120, 125 that can be used in implementing a computing device. In FIG. 1, this most basic configuration 130 is included within a dashed line. The processing units 110, 115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit 110 as well as a graphics processing unit or co-processing unit 115. The memory 120, 125 may be volatile memory (e.g., registers, cache, RAM), non-volatile memory (e.g., ROM, EEPROM, flash memory, etc.), or some combination of the two, accessible by the processing unit(s). The memory 120, 125 stores software 180 implementing one or more innovations described herein for updating client applications. In particular, a client application can be stored that includes a local compartment and a web compartment.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The tangible storage 140 may be removable or non-removable, and includes magnetic disks, magnetic tapes or cassettes, CD-ROMs, DVDs, or any other medium which can be used to store information in a non-transitory way and which can be accessed within the computing environment 100. The storage 140 can store instructions for the software 180 implementing one or more innovations for decoder optimization.

The input device(s) 150 may be a touch input device such as a keyboard, mouse, pen, or trackball, a voice input device, a scanning device, or another device that provides input to the computing environment 100. For video decoding, the input device(s) 150 may be a video card, TV tuner card, or similar device that accepts video input in analog or digital form, or a CD-ROM or CD-RW that reads video samples into the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment 100, computer-readable media include memory 120, storage 140, and combinations of any of the above. The computer-readable media can be any non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the disclosed methods can be implemented as computer-executable instructions stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perforin particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 2:
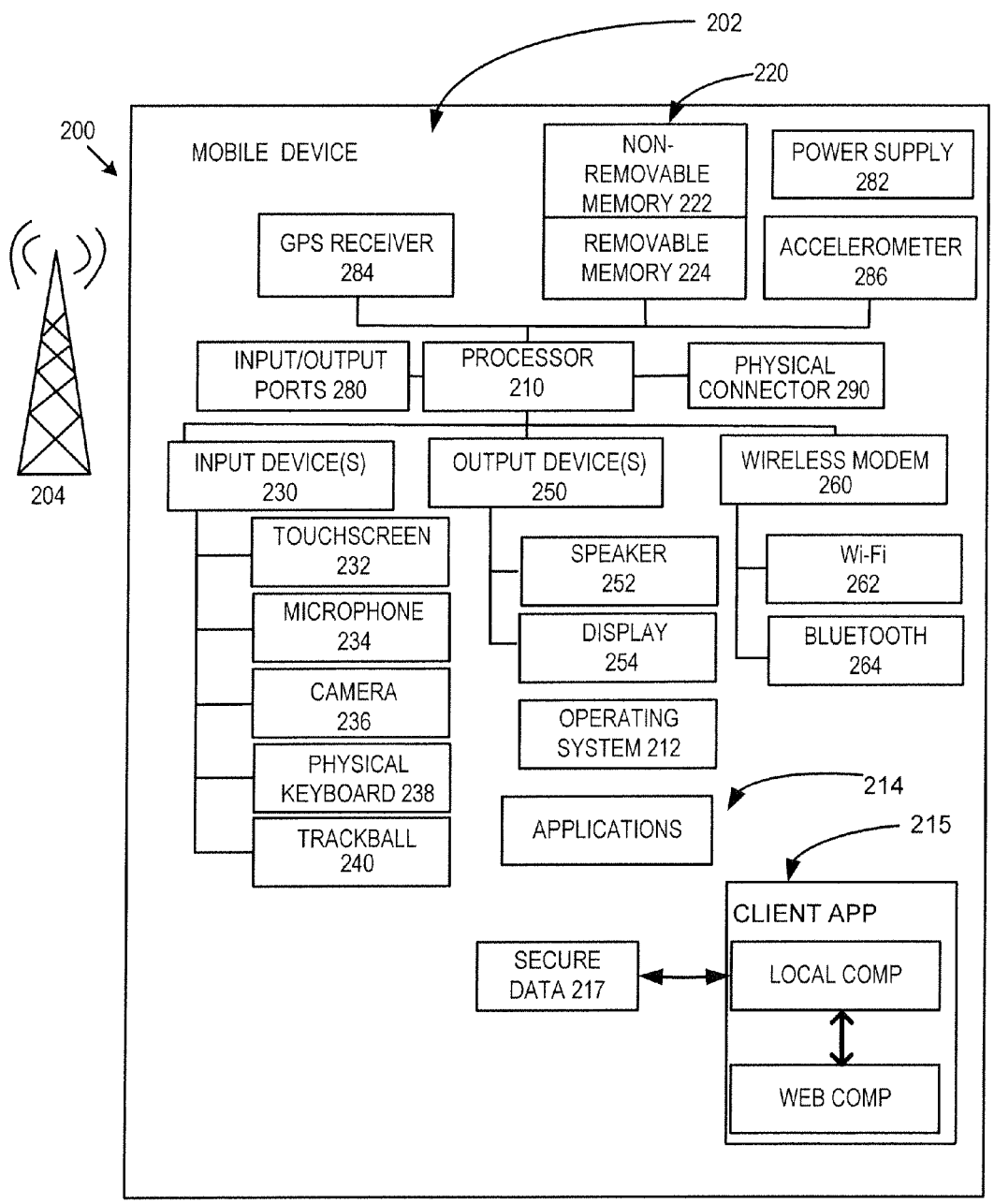
FIG. 2 shows an example client device that is a mobile phone.

FIG. 2 is a system diagram depicting an exemplary mobile device 200 including a variety of optional hardware and software components, shown generally at 202. Any components 202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 204, such as a cellular or satellite network.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 202 and support for one or more application programs 214. The application programs can include common mobile computing applications (e.g., email applications, calendars, contact managers, web browsers, messaging applications), or any other computing application. A particular application is shown at 215 includes a local compartment and a web compartment with a means for communicating commands between the two compartments, as described further below. The local compartment has access to secure data 217 on the mobile device. The web compartment, by contrast, does not have direct access to secure data on the mobile device, but can communicate with one or more server computers through the mobile communications network 204. As such, the web compartment can be called an isolated compartment.

The illustrated mobile device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touchscreen 232, microphone 234, camera 236, physical keyboard 238 and/or trackball 240 and one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output device.

A wireless modem 260 can be coupled to an antenna (not shown) and can support two-way communications between the processor 210 and external devices, as is well understood in the art. The modem 260 is shown generically and can include a cellular modem for communicating with the mobile communication network 204 and/or other radio-based modems (e.g., Bluetooth or Wi-Fi). The wireless modem 260 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, a satellite navigation system receiver 284, such as a Global Positioning System (GPS) receiver, an accelerometer 286, and/or a physical connector 290, which can be a USB port, IEEE 1394 (FireWire) port, and/or RS-232 port. The illustrated components 202 are not required or all-inclusive, as any components can deleted and other components can be added.

Figure 3:
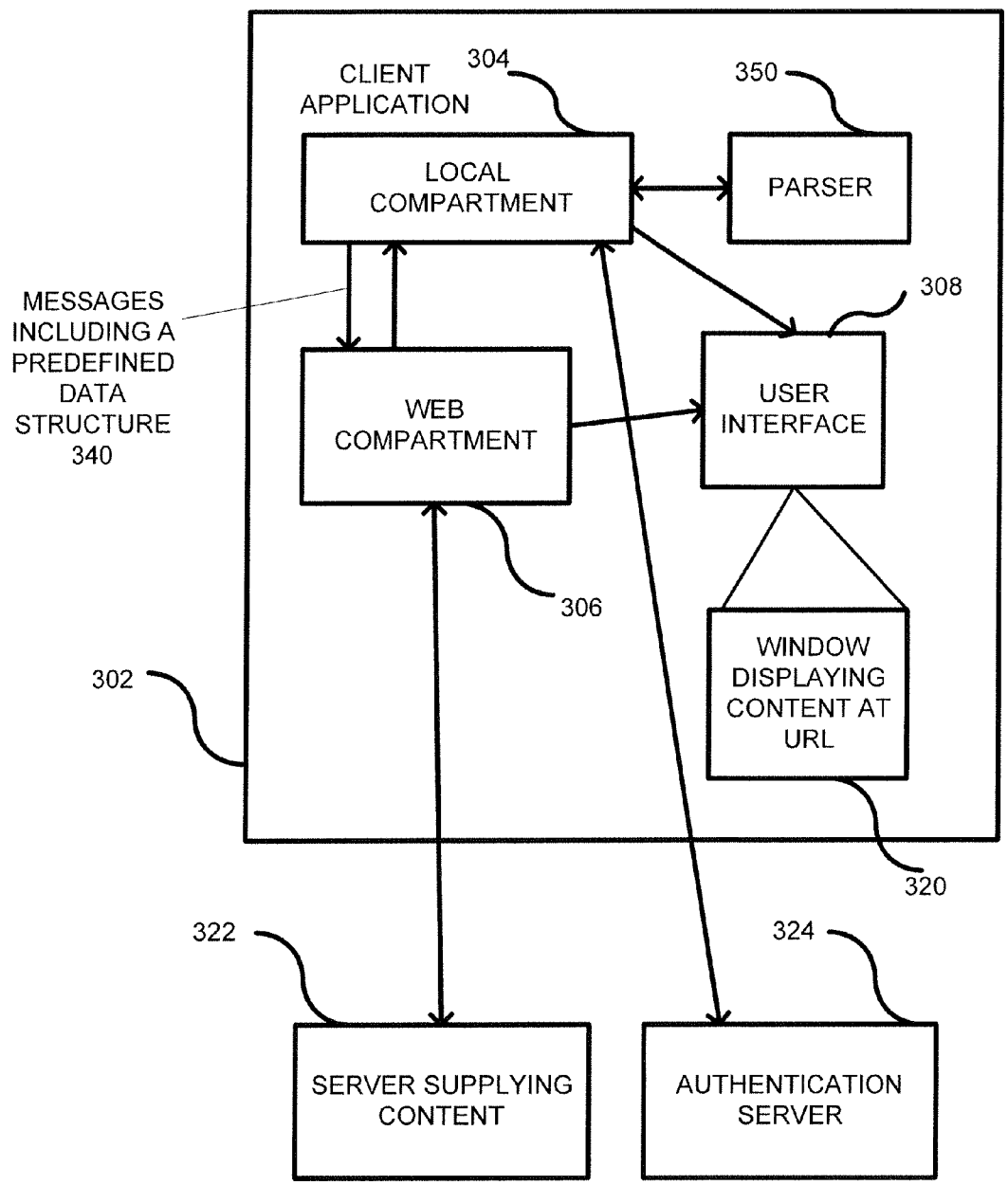
FIG. 3 shows a detailed example showing a structure of a client application and communication with remote servers.

FIG. 3 is a system diagram showing a client application 302 that can be executed on a client device, such as any of the client devices described herein. The client application includes a local compartment 304 and a web compartment 306. Both the local compartment 304 and the web compartment 306 can display user interface elements through a user interface 308. User interface elements can include icons, menus, controls (e.g., text boxes, buttons, hyperlinks, drop-down lists, check boxes, radio buttons, etc.), commands, etc. The user interface displays content, which includes user interface elements, and any desired textual information. Although the present description generally refers to user interface elements, it will be understood that the user interface elements can be extended to application elements that include that application logic and functionality that can be related or unrelated to user interface elements.

Generally, the web compartment 306 displays content in a separate window, popup, overlay, dialog box, embedded window, etc., such as window 320, but the content can appear integrated into a user interface page supplied by the local compartment. The content displayed by the web compartment can be received from a server computer 322. The web compartment can be an iframe tag including a URL (i.e., address) of the server computer 322 for retrieving and displaying the user interface elements and other content. Other compartments can be used, other than iframes, such as Java Sandbox, etc. The local compartment 304 can also display content in the user interface. The content supplied by the local compartment 304 is generally stored in the client device itself prior to launching. The content supplied by the web compartment 306 is generally received from a network server computer, dynamically at runtime.

In order to take advantage of updates of content in the server computer 322, when a user selects certain elements in the user interface 308, the local compartment 304 can initiate a sequence of events to display server-based content, such as in popup window 320. For example, the local compartment 304 can initiate an authentication of a URL using the authentication server 324 prior to opening the window 320. In response to receiving the URL from the local compartment 304, the authentication server 324 can pass back to the local compartment an authenticated URL, which includes at least the URL together with an encrypted user identifier and password. The local compartment can then transmit the authenticated URL to the web compartment 306. If desired, authentication of the URL need not be used, in which case the URL can be passed directly to the web compartment. As shown at 340, the communication can be in the form of a message 340 that includes a predefined data structure. An example message can be associated with a postmessage API, as is well understood in the art. Indeed, any Message Posting API can be used. The web compartment can then transmit the authenticated URL to the server 322 (the URL can be encrypted instead of authenticated.). The server computer 322 can decrypt the authenticated URL to obtain the user credentials. The server computer 322 can further generate a cookie for storage on the client device that can be used for future access.

If the user credentials are accepted, the server 322 can transmit the content to the web compartment 306. The web compartment can then launch a new window, dialog, overlay or other user interface technique, such as popup window 320, to display the content supplied from the server 322. User interaction with the popup window can result in commands being passed back from the web compartment 306 to the local compartment in the form of messages (e.g., string messages). A parser 350 can be used to parse the message and extract the commands therefrom. For example, the parser can parse a string representation of a data structure communicated between a local compartment and a web compartment. Other information can be included in the message, such as a version number of the client application. The version number can be passed to the server 322 through the web compartment so that the server can supply version-compatible content to the client application for display in popup window 320.

Figure 4:
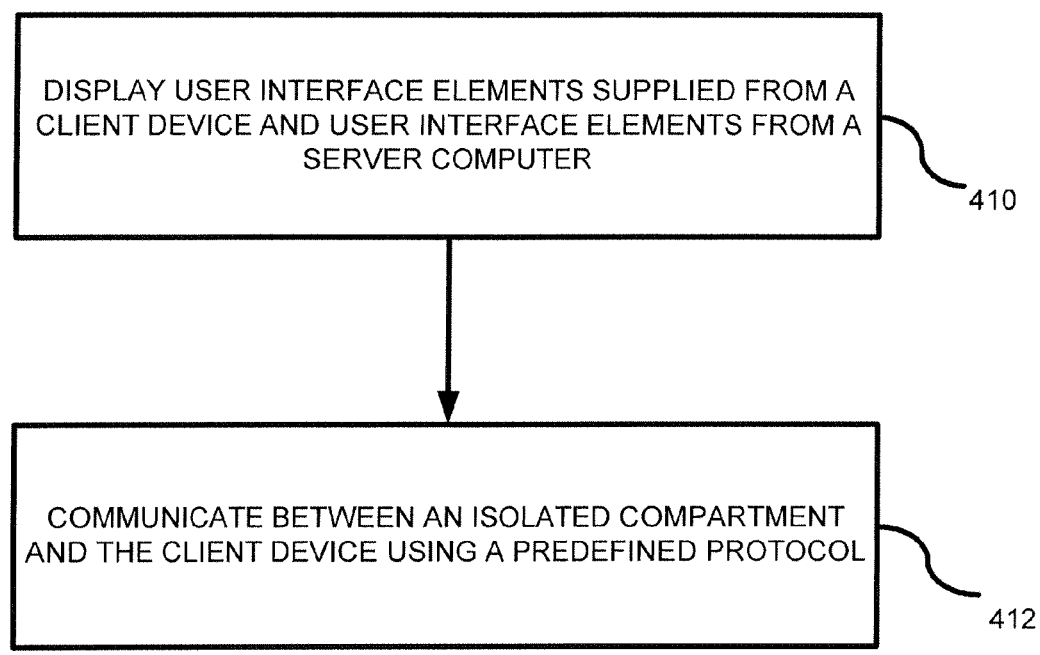
FIG. 4 shows an example flowchart of a method for communicating between a web compartment and a client device.

FIG. 4 is a flowchart of an exemplary embodiment for communicating with a web compartment on a client device. In process block 410, user interface elements can be displayed, wherein some user interface elements are supplied by the client device and other user interface elements are supplied by a server computer. For example, the user interface elements supplied by the client device can be stored when the application was installed on the client device. By contrast, the server supplied user interface elements can be received dynamically after launching the client application. The server supplied user interface elements can be displayed in a separate window, dialog box, overlay, etc. than the client supplied user interface elements. In process block 412, communication can occur between the web compartment and the client device using a predefined protocol. In one example, a user interface can step a user through a business process used to purchase an item. Certain parameters associated with the selections can be passed to a local compartment on the client device using the predefined protocol. Using the predefined protocol, the server computer can execute a predetermined set of commands on the client device.

Figure 5:
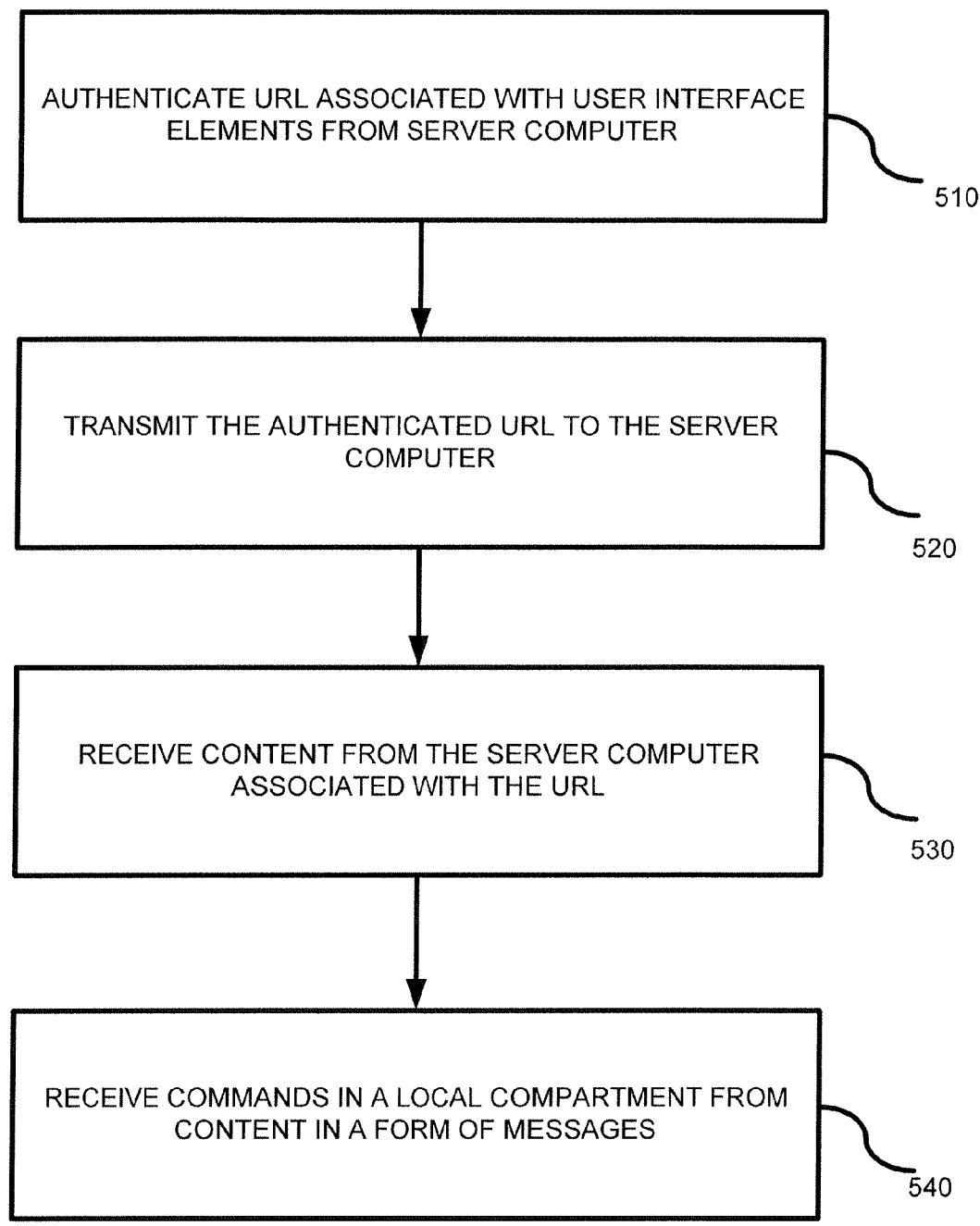
FIG. 5 shows an example flowchart for authenticating a URL and receiving commands from server-supplied content in a local compartment of a client application.

FIG. 5 is a flowchart of an embodiment showing additional process blocks that can be used. In process block 510, a URL associate with the user interface elements can be authenticated from a server computer. The authentication can include encrypted credentials associated with the user. In process block 520, an authenticated URL can be transmitted to the server computer. For example, a local compartment can pass the authenticated URL to a web compartment, which can then use the authenticated URL to access a server computer. In process block 530, content can be received from a server computer associated with the URL. In process block 540, commands can be received from a local compartment in the form of messages. For example, the content displayed to the user can assist the user through a business process. Based on user selections, certain parameters, such as purchase parameters, can be passed to the local compartment.

Figure 6:
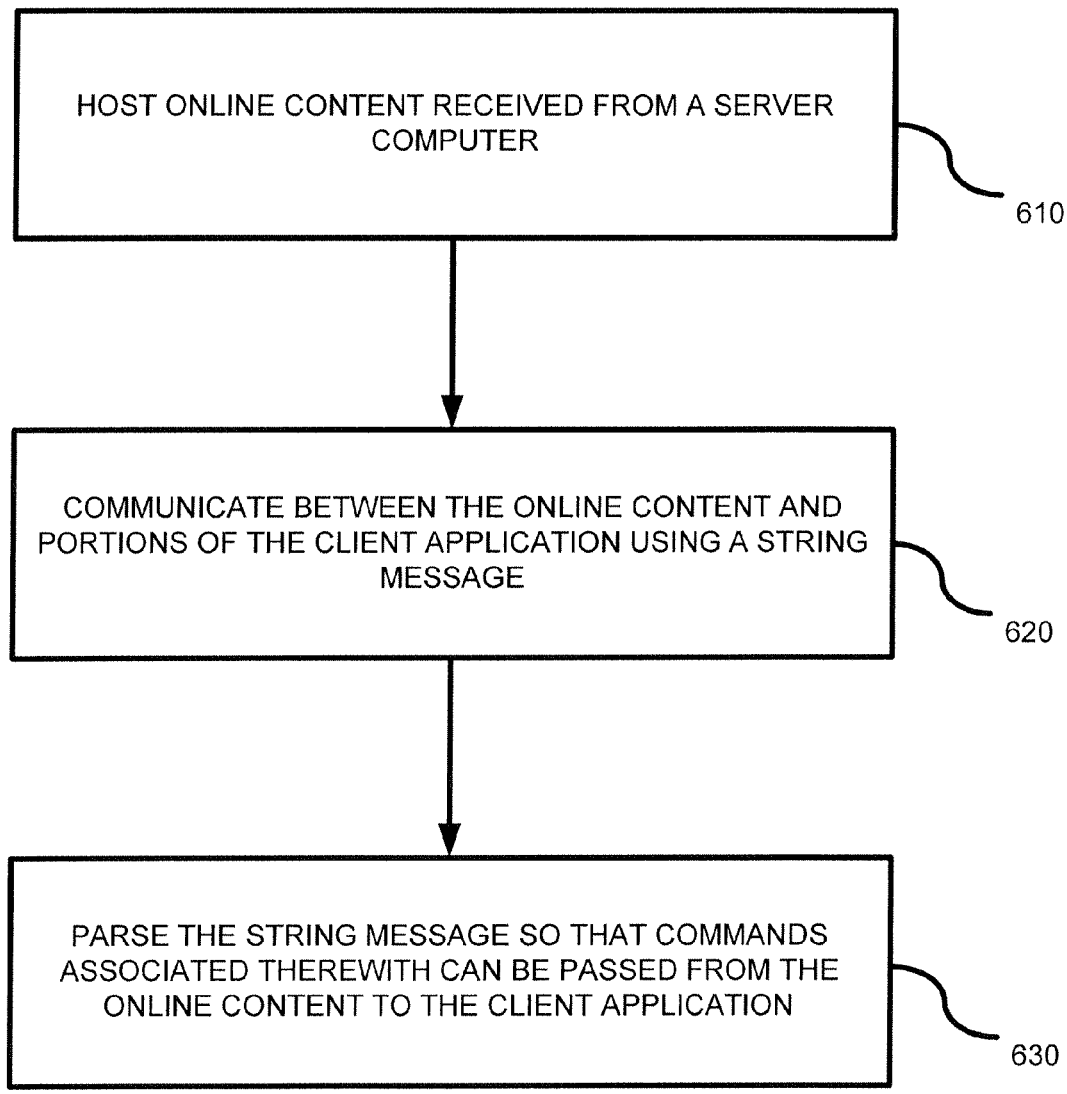
FIG. 6 shows an example flowchart of wherein string messages are received and parsed by a client application.

FIG. 6 is another flowchart of an embodiment for hosting online content. In process block 610, online content received from a server computer is hosted by a client application. For example, the online content can be hosted through an iframe structure. In process block 620, the content can have code associated therewith that can include commands included in a predefined data structure, and the commands can be communicated to portions of the client application using a string message. The portions of the client application can be a local compartment, for example. Additionally, the postmessage API can be used for communicating the message. In process block 630, the message can be parsed. A variety of commands can be passed in the string message, and the commands can be in the form of a data structure. As the protocol is only a simple message, the client and server can have a versioning infrastructure so that the client can communicate which version of the experience it supports from the server. The typical example of this would be if the server implemented a new feature that required changes on client, then the client would not know how to handle the message for that feature. There are multiple ways to handle this problem. In a first solution, the message receiver can return an acknowledgement message to every message to indicate whether it was fully/partially/not understood. The Sender can then use this acknowledgement to send an alternative message that the client may understand. In a second solution, a version can be included within the data structure. This allows the server and client to be slightly out of sync. With a version on the message, the receiver can write code to augment the message to the version it expects. For instance, if the server receives a message from the client, but the version is older than it expects, then it can augment that message to a correct version by setting default values for the properties not contained in the message. One skilled in the art will recognize that the embodiments are not limited to a versioned protocol. For example, message structures can support downlevel versions being able to consume sections of the message that such versions know how to parse.

An example string message is as follows:

"{\"verb\":\"CURRENT_PAGE\",\"uri\":\"https://live.box.com/purchaseNideo/b49fd844\",\"header\":{\"taskId\": \"VIDEO\",\"version\":{†\"major\":\"1\",\"minor\": \"0.0.0.0\"}},\"url\":{\"hash\":\"\",\"host\":\"live.xbox. com\",\"hostname\":\"live.box.com\",\"href\":\"https://live.box.com/purchase/Video/b49fd844\",\"pathname\":\": \"//purchase/Video/b49fd844\",\"port\":\"\",\"protocol\": \"https:\",\"search $\not{V}$ ":\"?productType=TVEpisode&watchOn=X8&purchaseAction=Buy&skin=x8&client=x8&hev= 1.0&clientRelease=X8RTM&clientVersion=1.1.1.0\"}}"

The word "verb" describes an event that occurred and the rest of the message describes the event. In this example, the verb is a property and the value of the property is "Current Page". Another property is "URI" and the value of that property is the https address, etc. Any desired property and value combinations can be used in the data structure. The string can include Javascript data structures communicated using JSON. JSON can be parsed by a Javascript engine into native Javascript data structures by the message receiver. The main property of this data structure is a name value pair whose name is "verb" and whose value indicates the nature of the message and the schema of the data in the structure. An example of a verb would be "Purchase" and the rest of the data would describe what was purchased.

Figure 7:
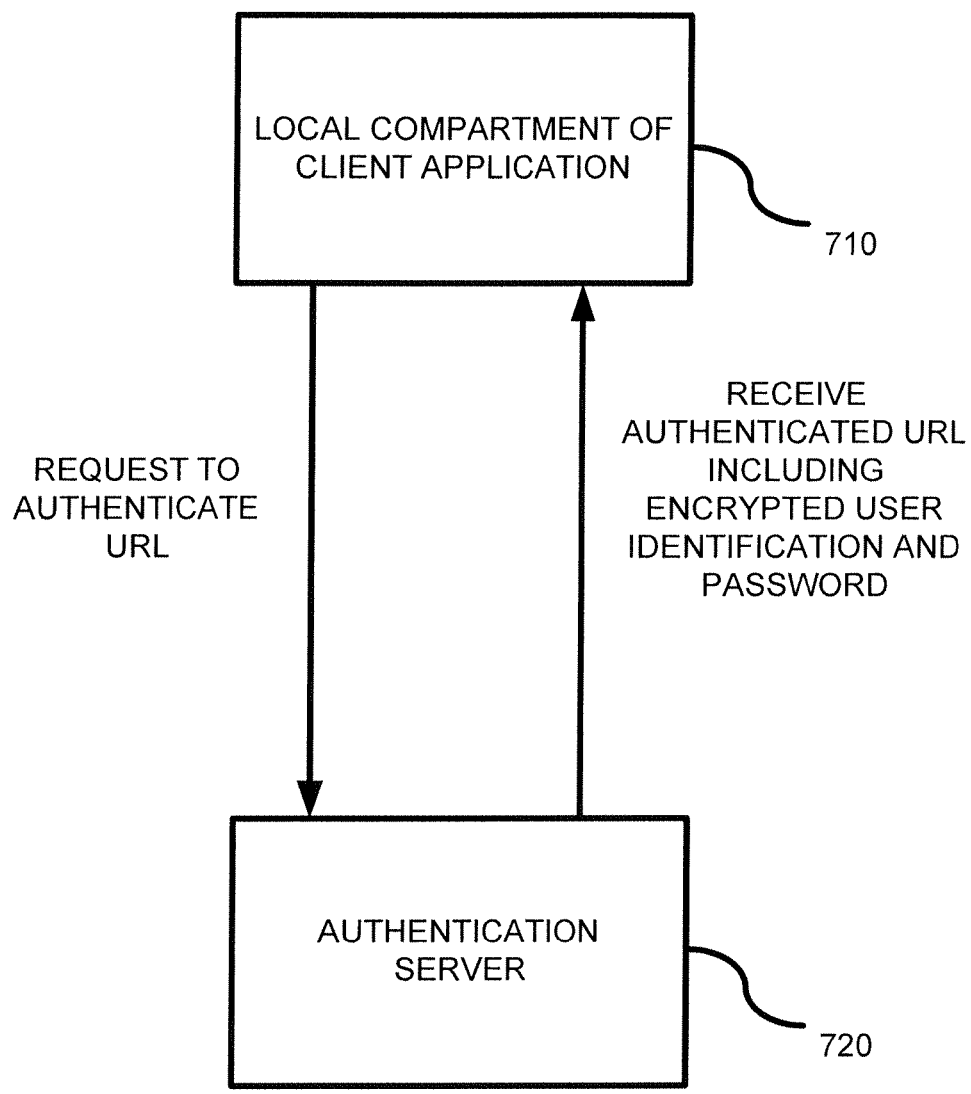
FIG. 7 shows a client application authenticating a URL from an authentication server.

FIG. 7 is an example of communication between the local compartment 710 and an authentication server 720. The local compartment can make a request to authenticate an address, such as a URL. The request includes the URL itself as a parameter and the authenticate command. In return, the authentication server can return the authenticated URL including an encrypted user identification and password. Although not shown, it is understood that a trusted key or the like can be used so that the client can trust the communication from the authentication server.

Figure 8:
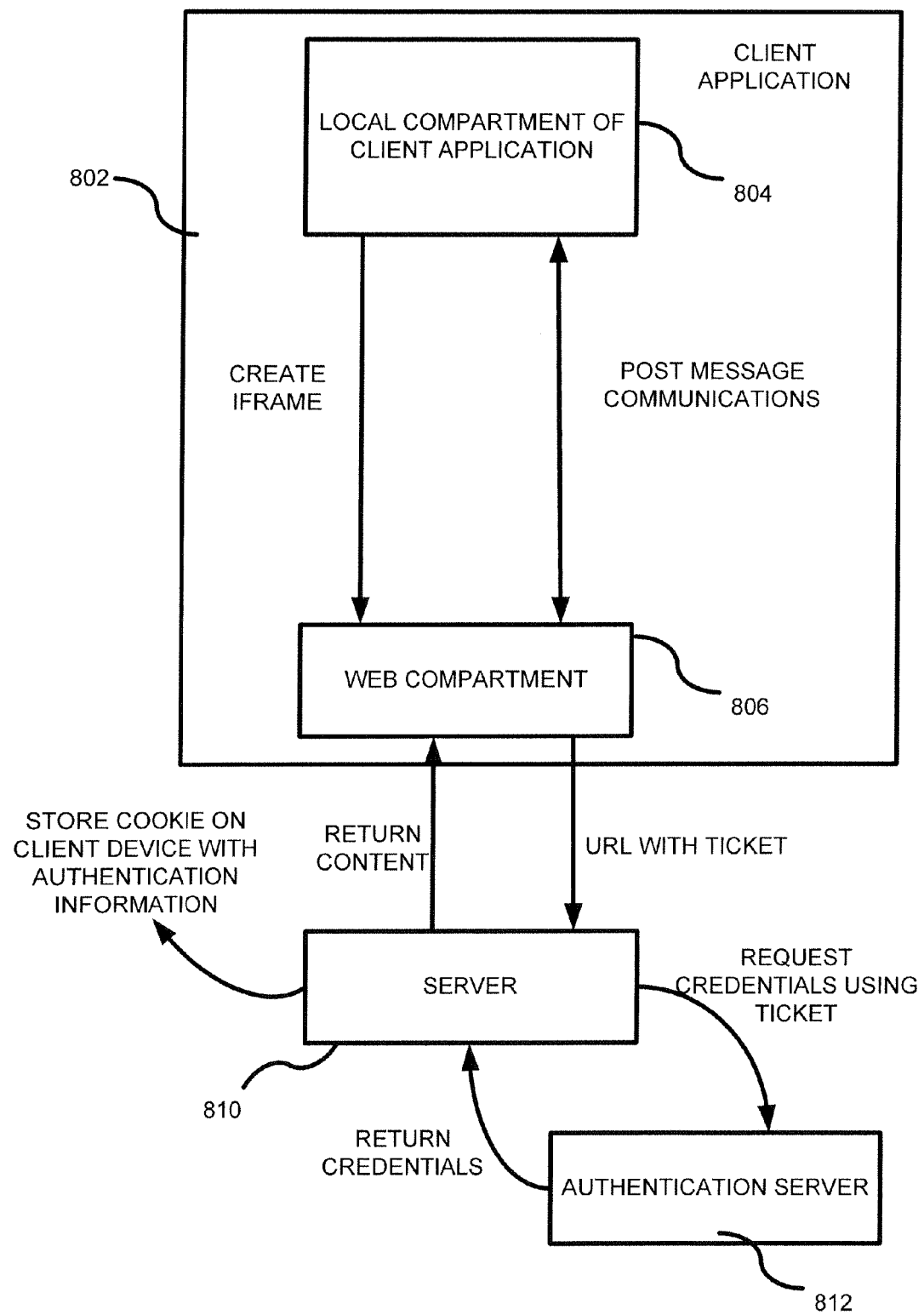
FIG. 8 shows an architecture for communication between the client application and the server supplying content.

FIG. 8 shows an example structure that can be used for allowing a web compartment to communicate with a client device. The client application 802 can include a local compartment 804 and a web compartment 806. The local compartment can pass a create iframe command to the web compartment when content is desired to be displayed from a server computer 810. The web compartment can communicate with the server computer 810 through a network (not shown), such as the Internet. The server can receive the URL associated with a page of content and a ticket including encrypted credentials. The URL with the ticket can be an HTTP request containing a URL and an authentication ticket. The server can communicate with an authentication server 812 passing the ticket and requesting verification that the credentials are proper. The server 810 can then store a cookie on the client device with authentication information so that future accesses can be authenticated without the authentication server.

The client architecture allows a client to share purchase flow business logic with a website. Such a structure makes engineering significantly cheaper to develop and test. In addition, by hosting this business logic and UI on the server, the client can update this logic and fix issues on the server, without the expense of deploying a new client.

The framework allows the client to blend UI elements delivered from the web with UI already on the client. This allows for sensitive business logic to be executed on the server, where it is more secure and updatable. These UI elements can then be seamlessly blended with client elements. A secure communication channel allows the server delivered elements to execute a limited set of commands on the client to complete the business logic. The UI elements can be delivered from the server and displayed inside the client application using an iframe control. A postmessage communication method is used to communicate between the iframe and the client.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of communicating with a web compartment on a client device, comprising:
   in a client application, displaying a user interface with a first group of user interface elements supplied in a local compartment on the client device and a second group of user interface elements received from a server computer, the second group of user interface elements being stored in an isolated compartment on the client device, both the local compartment and the isolated compartment being associated with the client application on the client device;
   communicating between the isolated compartment and the local compartment using a predefined protocol so that the server computer supplied second group of user interface elements can trigger a predetermined set of commands on the client device;
   responsive to the predetermined set of commands, blending the second group of user interface elements received from the server computer with the first group of user interface elements in the user interface of the client application, so that the user interface of the client application includes an updated user interface supplied, at least in part, through the isolated compartment.

2. The method of claim 1, wherein the isolated compartment uses an iframe tag.

3. The method of claim 1, wherein communicating includes receiving a command from the isolated compartment and the method includes parsing the command.

4. The method of claim 1, wherein communicating includes using a message posting API.

5. The method of claim 1, wherein the second group of user interface elements are displayed in a separate window, embedded window, dialog box, or overlay than the first group of user interface elements.

6. The method of claim 1, further including authenticating with a service that is providing the second group of user interface elements prior to opening a window or dialog box associated with the second group of user interface elements.

7. The method of claim 6, further including associating an encrypted user identifier and password with the address and transmitting with the encrypted user identifier to the server computer.

8. The method of claim 1, further including:
   in response to user selection, authenticating a URL associated with the second group of user interface and/or application elements;
   transmitting the authenticated URL to the server computer;
   receiving content from the server computer associated with the URL; and
   receiving commands in a local compartment on the client computer from the content in a form of text messages.

9. The method of claim 1, wherein the first group of user interface elements are associated with a local compartment and wherein communicating includes transmitting messages between the web compartment and the local compartment, wherein at least one message includes a version so that the client computer can inform the server computer of a software version currently supported by the client computer.

10. A computer-readable device storing instructions that upon execution cause a computer system to:
    host online content on a client device, the online content received from a server computer in a user interface of a client application;
    communicate between the online content stored on the client device and portions of the client application using a message;
    parse the message so that commands associated therewith can be passed from the online content stored on the client device to the client application; and
    update the user interface of the client application with the online content so that the user interface of a client application is updated after launching of the client application.

11. The computer-readable device of claim 10, further including authenticate an address associated with the online content and opening an isolated compartment using the authenticated address for displaying the online content in a window.

12. The computer-readable device of claim 10, wherein the online content is retrieved using a web compartment in the client application.

13. The computer-readable device of claim 10, wherein the portions of the client application include a local compartment, which has restricted access to a network.

14. The computer-readable device of claim 10, wherein the online content is hosted using an iframe.

15. The computer-readable device of claim 10, further including transmit a cookie to the server computer including an encrypted user identification and password.

16. The computer-readable device of claim 10, wherein the updates are for HTML, CSS and/or script files without updating other portions of the client application.

17. The computer-readable device of claim 16, wherein the user interface of the client application includes user interface elements stored in a file on a client device and user interface elements provided from the server computer.

18. The computer-readable device of claim 10, wherein the string message includes a version number of the client application that is supported.

19. A client device, comprising:
  a client application including:
    a local compartment as part of the client application that has limited access to network documents;
    a web compartment as part of the client application that has limited access to data stored on the client computer;
    a parser as part of the client application for parsing a representation of a data structure communicated between the local compartment on the client computer and the web compartment on the client computer; and
    a user interface displaying user interface elements from the local compartment and user interface elements from the web compartment as a combined user interface of the client application, wherein the user interface elements from the local compartment and the user interface elements from the web compartment are merged into a single page so that the combined user interface of the client application includes updates provided from the web compartment.

20. The client device of claim 19, wherein the web compartment is dynamically updated at runtime.

* * * * *